United States Patent [19]

Hoppe et al.

[11] 4,032,412
[45] June 28, 1977

[54] PROCESS FOR OPTIMAL PRESSURE CONTROL IN A MULTI-STAGE EVAPORATION UNIT

[75] Inventors: Alfred Hoppe, Frankfurt am Main; Walter Geistert, Hamburg, both of Germany

[73] Assignee: Deutsche Texaco Aktiengesellschaft, Hamburg, Germany

[22] Filed: Jan. 30, 1975

[21] Appl. No.: 545,681

Related U.S. Application Data

[60] Division of Ser. No. 425,431, Dec. 17, 1973, Pat. No. 3,894,915, which is a continuation of Ser. No. 165,621, July 23, 1971, abandoned.

[52] U.S. Cl. .................................. 203/22; 165/1; 202/173; 202/174; 202/177; 202/180; 202/186; 203/73; 203/87
[51] Int. Cl.² .................. B01D 3/42; B01D 1/26
[58] Field of Search ............ 203/2, 22, 24, 73, 87, 203/91; 202/173, 174, 177, 180, 160, 185 R, 186, 185 A–185 E; 165/1

[56] References Cited

UNITED STATES PATENTS

| | | | |
|---|---|---|---|
| 690,611 | 1/1902 | Roake | 202/185 |
| 700,374 | 5/1902 | Roake | 202/185 D |
| 770,149 | 9/1904 | Bailey | 202/185 D |
| 1,902,538 | 3/1933 | Brace et al. | 202/177 |
| 2,164,275 | 6/1939 | Hills | 202/177 |
| 2,304,915 | 12/1942 | Ittner | 202/180 |
| 2,680,708 | 6/1954 | Cook | 202/186 |
| 2,908,618 | 10/1959 | Bethon | 202/177 |
| 2,979,442 | 4/1961 | Balgor | 202/173 |
| 3,515,646 | 6/1970 | Walker et al. | 202/173 |
| 3,630,854 | 12/1971 | Huhta-Koivisto et al. | 202/186 |

Primary Examiner—Wilbur L. Bascomb, Jr.
Attorney, Agent, or Firm—Thomas H. Whaley; Carl G. Ries; Theron H. Nichols

[57] ABSTRACT

A system for optimal pressure control in a multistage evaporation unit comprising two or more series connected evaporation stages with at least one of the stages preceded by a heat source, where the fresh or feed solution is passed through heat exchangers in which it is heated by means of the vapors from the subsequent evaporation stages, and where a heat exchanger adapted to permit free flow of the vapor condensate through the heat exchanger inner portion or tube portion is arranged in the line through which the vapor leaves the higher-pressure evaporation stage.

2 Claims, 3 Drawing Figures

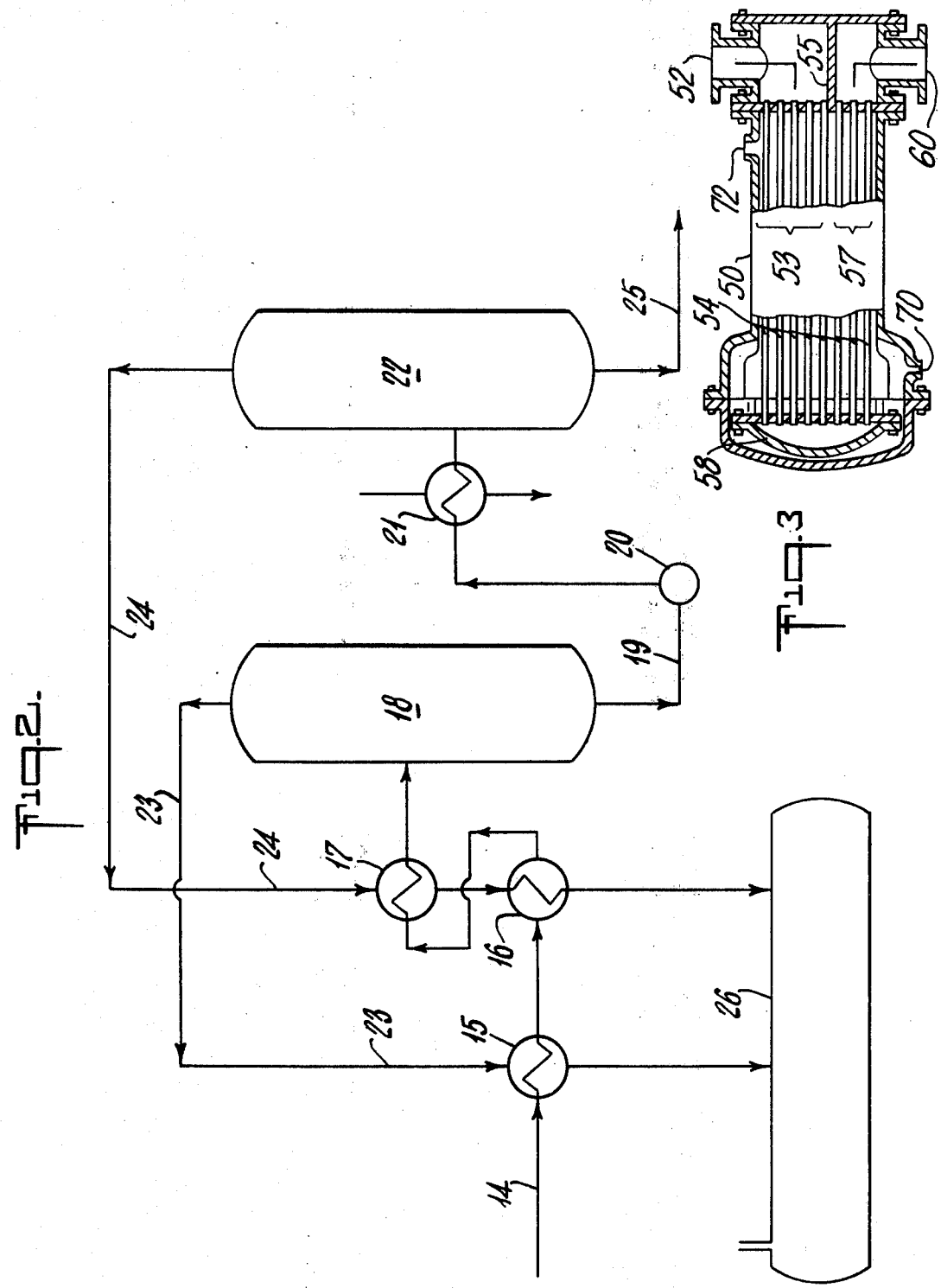

PROCESS FOR OPTIMAL PRESSURE CONTROL IN A MULTI-STAGE EVAPORATION UNIT

This is a division of application Ser. No. 425,431 filed 12-17-73, now U.S. Pat. No. 3,894,915, issued July 15, 1975, which was a continuation of Ser. No. 165,621, filed 7-23-71, now abandoned.

FIELD OF THE INVENTION

This invention relates to a system for optimal pressure control in a multi-stage evaporation unit, wherein one or more evaporation stages, at least one of which is preceded by a heat source, are connected in series, and the fresh or feed solution passes through heat exchangers where it is heated with vapors from the preceding or subsequent evaporation stages.

DESCRIPTION OF THE PRIOR ART

It is known that particular pressure conditions may be maintained between the individual evaporation stages, by providing each evaporator with a pressure regulator acting as a potential interference factor and regulating a control valve to adjust the pressure to the selected theoretical value in the event of pressure deviations. The control valve is arranged in the line through which the vapor effluent leaves the evaporation stage, and this line is arranged in the outer or shell portion of a heat exchanger or condenser in which the fresh or feed solution is heated.

For safety reasons the dimensions of the heat exchanger should be such as to permit it to condense a slightly larger quantity of vapors than actually leave the evaporation stage, while maintaining the desired pressure conditions. As a result, the heat exchanger would always be partially flooded and so never work up to its full efficiency.

The partial flooding of the heat exchanger results in a storage of the high-pressure condensate at high temperatures. When solvents susceptible to temperature are used the decomposition products will cause corrosion and/or deposit formation, necessitating a periodical overhauling of the plant, which in turn reduces the throughput capacity of the latter. Moreover, there is the risk that a build-up of inert gases in the condensing system may cause the pressure control valve to open, thereby expanding larger amounts of vapors along with the inert gases. The above applies to evaporation units operating according to either the counter-flow or the parallel flow principle.

SUMMARY OF THE INVENTION

It is an object of the instant invention to avoid the above mentioned disadvantages encountered with pressure control in conventional units and provide a trouble safe system ensuring complete utilization of the heat exchanger capacities while at the same time condensing the vapors in the heat exchangers or condensers completely.

The invention, relates to a system for optimal pressure control in a multi-stage evaporation unit, wherein two or more evaporation stages, at least one of which is preceded by a heat source, are connected in series, and the fresh solution passes through heat exchangers in which it is heated by means of the vapors from the subsequent evaporation stages, characterized in that a heat exchanger adapted to permit free flow of the vapor condensate through the heat exchanger inner portion or tube is arranged in the line through which the vapor leaves the higher-pressure evaporation stage.

The invention has solvent the problem by installing in the line through which the vapor effluent leaves the higher-pressure evaporation unit, a heat exchanger as a throttling means adapted to permit unimpeded passage of the vapor condensate and assume the pressure expanding function formly performed by the pressure control valve. The effluent discharged at the outlet of the heat exchanger or condenser mainly consists of condensate which on account of the said throttling means acts as a vapor or gas lock when the pressure in the pertinent evaporation stage is too low due to the vapor volume exceeding many times the condensate, and which only permits the passage of uncondensable gases present in small amounts.

DETAILED DESCRIPTION OF THE INVENTION

Figure 1:
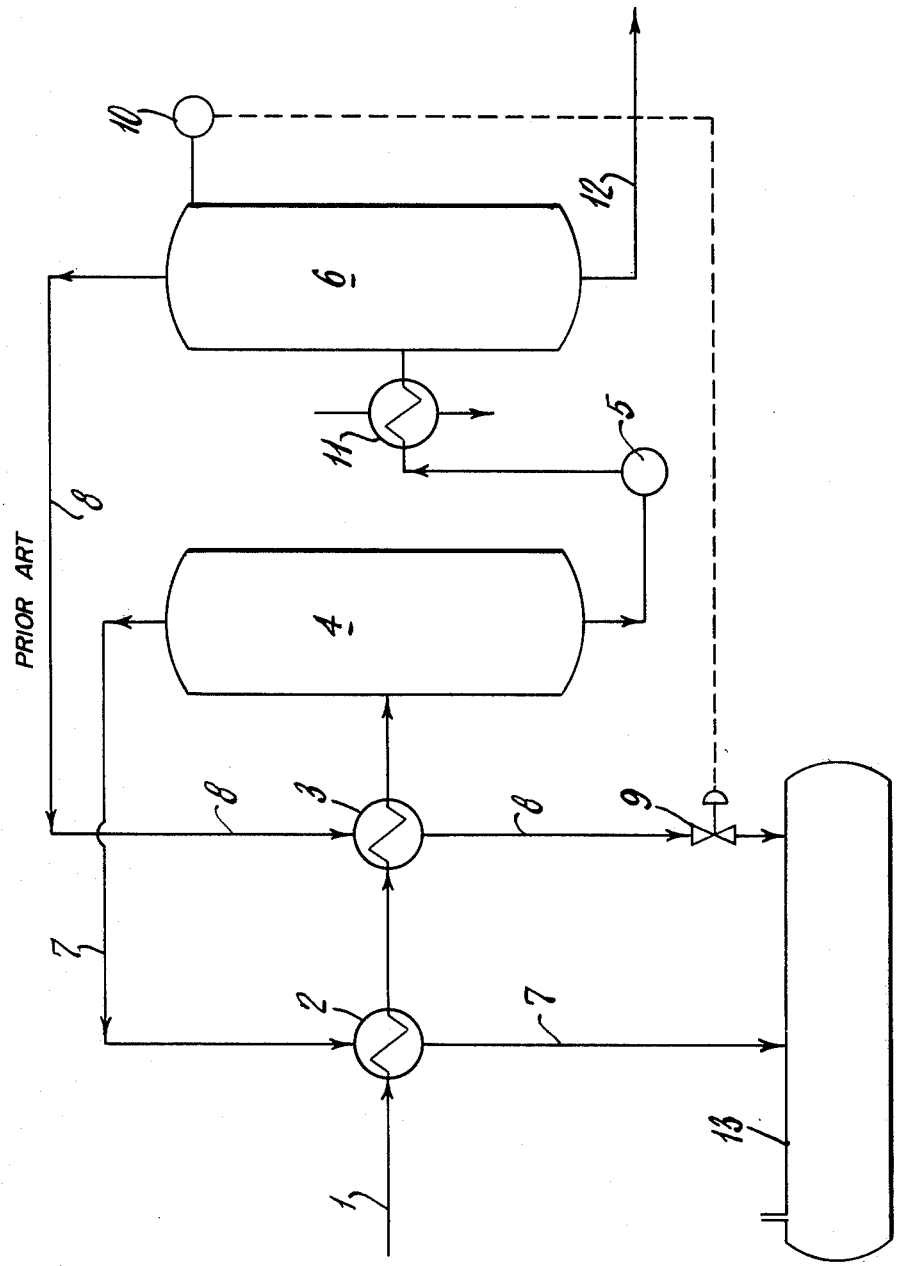

In a preferred embodiment of the system of this invention the heat exchanger consists of a shell-and-tube heat exchanger, wherein the throttling is desirably effected in the tube portion, for example, by decreasing the cross-section of the passage through the tubes in the flow direction.

In the following part of the specification one embodiment of the system of the invention is described in comparison with a known system, by the aid of drawings, of which FIG. 1 is a representation of an embodiment of a known two-stage evaporation unit; and FIG. 2 is a representation of an embodiment of the system of the invention applied to a two-stage evaporation unit.

The evaporation unit shown in FIG. 1 is operated according to the counter-flow principle, and the fresh solution, such as a furfural-hydrocarbon solution, passes through line 1 through the tube portions of heat exchangers 2 and 3 to evaporator 4 operating under nearly atmospheric pressure. The unevaporated portion of the solution is pumped via pump 5 to higher-pressure evaporator 6.

The vapor leaving the first evaporator stage 4 passes via line 7 through the shell portion of heat exchanger 2, and the vapor leaving evaporator 6 passes through the shell portion of heat exchanger 3, and in vapor line 8 subsequent to heat exchanger 3 there is a control valve 9 which is adjusted according to the selected stage pressure by pressure regulator 10 arranged in evaporator 6.

The bottom phase of evaporator 4 is passed to heat exchanger 11 arranged intermediate evaporators 4 and 6; this heat exchanger is designed as a heater heating the liquid stream to the desired temperature. The low-solvent product is withdrawn from the unit through line 12. The solvent condensates are collected in solvent tank 13.

This shows that the two-stages evaporation of FIG. 1 represents a control system adapted to maintain the stage pressures at the desired level. If more stages are involved the number of control systems required is to be increased correspondingly.

Basically, the two-stage evaporation unit shown in FIG. 2 is similar to that of FIG. 1, with the exception that according to the invention it has no control system for the stage pressures. In this unit, the fresh solution passes via line 14 through the tube portion of heat exchaanger or condenser 15, through the shell portion of heat exchanger 16, and finally, through the tube portion of heat exchanger 17 to evaporator 18. From there the liquid solution is passed by means of pump 20 via line 19 over a conventional heater 21 (e.g. steam condenser, hot oil exchanger, etc.) to evaporator 22. The vapor which is withdrawn from evaporator 18 via line 23 now flows through the shell portion of heat exchanger 15, heating the fresh solution, and condensing. The vapor from evaporator 22 operating at a higher pressure is next passed via line 24 through the shell portion of heat exchanger or condenser 17 in which most of it is condensed. The condensate and the remainder vaporous portion are then passed through the tube portion of heat exchanger 16, where the still uncondensed portion of the vapor is condensed. The low-solvent product is withdrawn from the unit via line 25. The solvent condensates are collected in solvent tank 26.

The cross-sectional area of the tube of heat exchanger 16 can, for example, remain constant in flow direction and be adapted to permit the passage of the condensed vapor at a relatively low pressure drop. The pressure difference existing between evaporator 22 and pool 26 is mainly reduced in the initial tube section of heat exchanger 16 where both the condensed and the uncondensed vapors move along at a high rate.

Conveniently, the heat exchanger cross-sectional areas are reduced either continuously or step-wise in flow direction so as to increase the amount of condensing vapors in the initial section of the heat exchanger. The heat exchanger 16 may be a shell-and-tube heat exchanger having successive sections in which the number of tubes arranged parallel to each other successively decreases in flow direction.

It follows that the two-stage unit shown in FIG. 2 does not require a control system to maintain the stage pressure but is adapted to automatically adjust the pressure and to ensure complete condensation.

As none of the condensation surfaces of the condenser needs to be flooded for control purposes, the heat exchange surfaces may be used to their full extent and the vapor condensation temperature adjusts itself to the lowest possible level. There is no storage of vapor condensate anywhere in the system, and so the decomposition of solvent is avoided. Also, the heat exchange surface available in the system is used optimally for vapor condensation, which means that the adjusting pressure and hence the condensation temperature are kept at their lowest possible levels.

The instant specification describes evaporation unit applying the counter-flow principle, but it may easily be applied by someone skilled in the art to a unit applying the parallel flow principle, which also excludes the necessity of pressure control by pressure sensors and control valves. Other than in the aforementioned examples, the system of this invention may be applied also in multi-stage evaporation units with decreasing pressure and temperature — seen in flow direction from the initial stage.

The invention may also be used for the concentration of aqueous salt solutions, e. g. desalting of sea water by multi-stage distillation, evaporation of sugar solutions, and concentration of diluted urea solution, etc. Furthermore, the invention may be used advantageously for the concentration of aqueous raw alcohols and for the separation of hydrocarbon cracking products by distillation. Finally, it may be used to separate a component from an extraction mixture, like separating furfural from a hydrocarbon extract by distillation, etc.

What is claimed is:

1. A method for controlling pressure of vapor effluent in a high pressure vapor line from a high pressure evaporator to a tank in a multi-stage evaporator unit for increased efficiency thereof comprising,
    a. passing a fresh liquid feed in a supply line to a multi-stage evaporator until through a first preheating heat exchanger,
    b. passing the fresh liquid feed from the first heat exchanger to a second shell-and-tube heat exchanger in series with the first heat exchanger,
    c. passing the fresh liquid feed through the shell of the second heat exchanger,
    d. passing the fresh liquid feed from the second heat exchanger to a third shell-and-tube heat exchanger in series with the second heat exchanger,
    e. passing the fresh liquid feed through the tubes of the third heat exchanger to the multi-stage evaporator unit,
    f. passing the vapor effluent in a high pressure vapor line from the multi-stage evaporator unit first through the shell of the third heat exchanger for condensing a portion of the vapor into a condensate, and
    g. passing both the condensate and remaining vapor from the third heat exchanger into the tubes of the shell-and-tube second heat exchanger for condensing the remaining vapor in the latter tubes for increasing resistance to flow in the second heat exchanger for maintaining pressure in the high pressure vapor line and to increase the temperature of the fresh liquid feed to the multi-stage evaporator unit for increased efficiency.

2. A method for controlling pressure of vapor effluent in a high pressure vapor line from a high pressure evaporator to a condensate tank in a multi-stage evaporator unit for increased efficiency thereof comprising,
    a. preheating a fresh liquid feed solution to a multi-stage evaporator unit by passing it through a first heat exchanger, then through a second shell-and-tube heat exchanger, and then through a third shell-and-tube heat exchanger prior to entering the multi-stage evaporator unit,
    b. forming a condensate by passing a vapor effluent through a high pressure vapor line from the multi-stage evaporator unit to the third heat exchanger,
    c. passing the vapor effluent through the shell of the third heat exchanger, and
    d. increasing the resistance to flow in the second heat exchanger by passing both the condensate and the remaining vapor from the third heat exchanger into the tubes of the shell-and-tube second heat exchanger for condensing the remaining vapor in the latter tubes for maintaining pressure in the high pressure vapor line and to increase the temperature of the fresh liquid feed to the multi-stage evaporator unit for increased efficiency.

* * * * *

UNITED STATES PATENT AND TRADEMARK OFFICE
CERTIFICATE OF CORRECTION

PATENT NO. : 4,032,412
DATED : June 28, 1977
INVENTOR(S) : Alfred Hoppe and Walter Geistert It is certified that error appears in the above-identified patent and that said Letters Patent are hereby corrected as shown below:

Claim 1, line 6, "until" should be --unit--.

Signed and Sealed this

Fourth Day of November 1980

[SEAL]

Attest:

SIDNEY A. DIAMOND

Attesting Officer

Commissioner of Patents and Trademarks